US012046084B2

(12) United States Patent
Sumiya et al.

(10) Patent No.: US 12,046,084 B2
(45) Date of Patent: Jul. 23, 2024

(54) SURVEILLANCE SYSTEM FOR AN INFRASTRUCTURE AND/OR A VEHICLE WITH EVENT DETECTION

(71) Applicant: MITSUBISHI HEAVY INDUSTRIES, LTD., Tokyo (JP)

(72) Inventors: Daisuke Sumiya, Erlangen (DE); Ryota Hiura, Erlangen (DE); Johannes Dagner, Erlangen (DE); Sascha Maisel, Erlangen (DE)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 281 days.

(21) Appl. No.: 17/618,572

(22) PCT Filed: Jun. 17, 2020

(86) PCT No.: PCT/IB2020/055631
§ 371 (c)(1),
(2) Date: Dec. 13, 2021

(87) PCT Pub. No.: WO2020/254972
PCT Pub. Date: Dec. 24, 2020

(65) Prior Publication Data
US 2022/0262171 A1 Aug. 18, 2022

(30) Foreign Application Priority Data
Jun. 17, 2019 (EP) .................................... 19180725

(51) Int. Cl.
*G07C 5/00* (2006.01)
*G07C 5/08* (2006.01)
(Continued)

(52) U.S. Cl.
CPC ........... *G07C 5/008* (2013.01); *G07C 5/0825* (2013.01); *G07C 5/0833* (2013.01); *G07C 5/10* (2013.01); *G08B 23/00* (2013.01)

(58) Field of Classification Search
None
See application file for complete search history.

(56) References Cited

U.S. PATENT DOCUMENTS 10,042,363 B1 * 8/2018 Hayward ............... B60K 35/00
10,053,121 B2 * 8/2018 Franchitti ............... B61L 27/57
(Continued)

FOREIGN PATENT DOCUMENTS

CN 102123899 A 7/2011
CN 104049599 A 9/2014
(Continued)

OTHER PUBLICATIONS

International Search Report and Written Opinion of International Application No. PCT/IB2020/055631 mailed Sep. 9, 2020; 11pp.

*Primary Examiner* — Muhammad Adnan
(74) *Attorney, Agent, or Firm* — HAUPTMAN HAM, LLP

(57) ABSTRACT

The invention relates to a surveillance system for an infrastructure and/or for a vehicle, comprising at least two sensor modules configured to collect respective sensor data from a respective associated sensor; an analysis module configured to access the sensor data; wherein the sensor modules are configured to provide the sensor data with a time stamp; and the analysis module is configured to detect a given event based on sensor data of at least one first sensor module and to associate sensor data of at least one other second sensor module with the event based on the time stamps of the sensor data to provide an enhanced surveillance and/or maintenance system, in particular a system suitable for large
(Continued)

and/or complex infrastructures, vehicles, and combinations thereof.

13 Claims, 1 Drawing Sheet

(51) Int. Cl.
*G07C 5/10* (2006.01)
*G08B 23/00* (2006.01)

(56) References Cited

U.S. PATENT DOCUMENTS

| | | | | |
|---|---|---|---|---|
| 2011/0031671 | A1 | 2/2011 | Toncelli | |
| 2011/0216200 | A1 * | 9/2011 | Chung | H04N 7/183 348/148 |
| 2011/0313671 | A1 * | 12/2011 | Nedilko | B61K 9/08 702/14 |
| 2015/0021444 | A1 * | 1/2015 | Goergen | G06F 3/0683 711/148 |
| 2015/0248275 | A1 * | 9/2015 | Gallo | G01T 7/00 702/189 |
| 2016/0081625 | A1 * | 3/2016 | Kim | H04W 4/80 600/595 |
| 2016/0159380 | A1 | 6/2016 | Le-Corre et al. | |
| 2019/0138423 | A1 * | 5/2019 | Agerstam | G06F 11/3466 |
| 2020/0031373 | A1 | 1/2020 | Ohki | |
| 2020/0129077 | A1 * | 4/2020 | Rogers | A61B 5/02125 |
| 2020/0301470 | A1 * | 9/2020 | Lin | G06F 1/1694 |
| 2020/0307614 | A1 * | 10/2020 | Jordan | H04W 4/12 |
| 2020/0317238 | A1 * | 10/2020 | Bjurström | B61L 15/0063 |
| 2020/0405159 | A1 * | 12/2020 | Archdeacon | A61B 5/7278 |
| 2021/0269077 | A1 * | 9/2021 | Speckmeier | B61L 27/57 |
| 2021/0349979 | A1 * | 11/2021 | Cohen | H04L 63/1425 |
| 2022/0063690 | A1 * | 3/2022 | Hogg | B61L 27/57 |
| 2022/0144325 | A1 * | 5/2022 | Kurz | B61L 23/047 |
| 2022/0381564 | A1 * | 12/2022 | Kitchen | G01C 21/343 |

FOREIGN PATENT DOCUMENTS

| | | | |
|---|---|---|---|
| CN | 105667538 | A | 6/2016 |
| EP | 2784449 | A2 | 10/2014 |
| EP | 3042823 | A1 | 7/2016 |
| EP | 3254928 | A1 | 12/2017 |
| JP | 2002247562 | A | 8/2002 |
| JP | 2016-024823 | A | 2/2016 |
| JP | 2019-512807 | A | 5/2019 |
| WO | 2010/003220 | A1 | 1/2010 |
| WO | 2015/174113 | A1 | 11/2015 |
| WO | 2017/165880 | A1 | 9/2017 |
| WO | 2018180311 | A1 | 10/2018 |

* cited by examiner

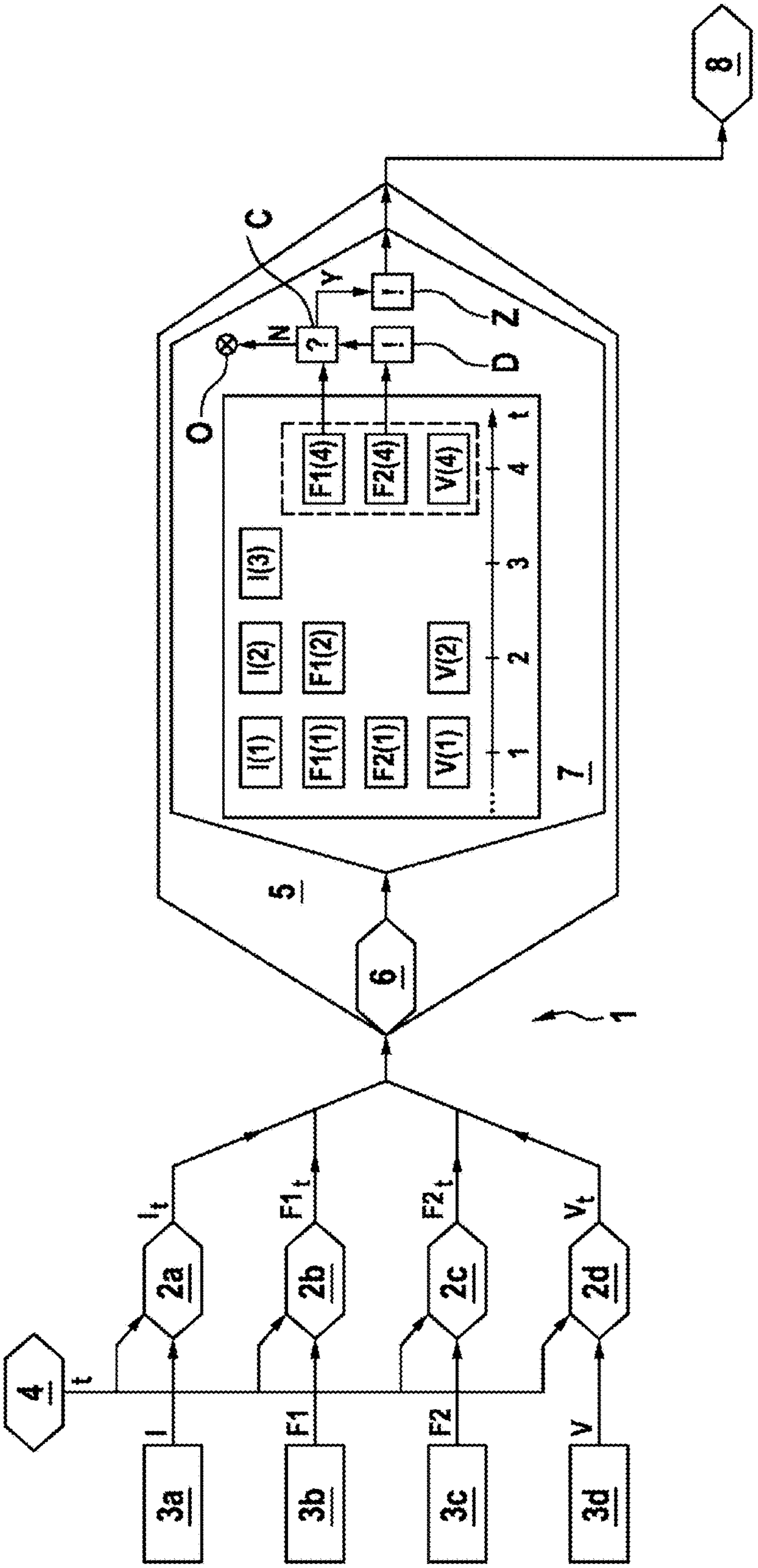
3a
3b
3c
3d
I
F1
F2
V
4
t
2a
2b
2c
2d
I t
F1 t
F2 t
V t
1
6
5
7
I(1)
F1(1)
F2(1)
V(1)
I(2)
F1(2)
V(2)
I(3)
F1(4)
F2(4)
V(4)
1
2
3
4
t
O
N
?
C
Y
!
D
Z
8

SURVEILLANCE SYSTEM FOR AN INFRASTRUCTURE AND/OR A VEHICLE WITH EVENT DETECTION

RELATED APPLICATIONS

The present application is a National Phase of International Application Number PCT/IB2020/055631 filed Jun. 17, 2020 and claims priority of European Application Number 19180725.4 filed Jun. 17, 2019.

The invention relates to a surveillance and/or maintenance system, in particular a modular surveillance and/or maintenance system, for an infrastructure such as a train station, an airport, a store or another public space and/or for a vehicle such as a train, an airplane or a ship with event detection. Such a surveillance system comprises at least two sensor modules configured to collect or record respective sensor data from a respective associated sensor such as a camera, microphone, or another sensor providing the sensor data, and at least one analysis module configured to access the sensor data.

As in modem infrastructures and/or vehicles both size and complexity increase, there is an increasing demand for automated or at least partly automated surveillance and/or maintenance systems.

In this context, JP 2002 247 562 A provides a monitoring camera system coping with a network by which a working rate equivalent to the one of a multiprocessor type computer can be realized. This monitoring camera system is provided with said network for transmitting image data outputted from a plurality of monitoring camera units, shared by a plurality of the monitoring cameras and a server for receiving the image data via the network. A plurality of the monitoring cameras is provided with a communication control part for setting a protocol corresponding to the network to the image data and the server is provided with a protocol control part for receiving the image data to which the protocol is set from the network.

As for vehicle surveillance, WO 2018/180311 A1 provides a technology for monitoring train doors for improving the accuracy of detection of trapping in vehicle doors. Therein, the server compares the difference between a static image, the reference image, from each monitoring camera of a normal state in which there is no trapping in vehicle doors, and a static image, an observation image, acquired in a prescribed acquisition time. If a difference is detected and hence trapping in the door is probable, this can be indicated on a monitor.

It is a problem to be solved by the invention at hand to provide an enhanced surveillance and/or maintenance system, in particular a system suitable for large and/or complex infrastructures, vehicles, and combinations thereof.

This problem is solved by the subject matter of the independent claims. Advantageous embodiments are apparent from the dependent claims, the description, and the drawings.

One aspect relates to a surveillance and/or maintenance system for an infrastructure such as a train station, an airport, store, or another public space, for instance, and/or for a vehicle such as train, airplane, or a ship, for instance. In particular, the surveillance and/or maintenance system is a modular surveillance and/or maintenance system. A surveillance system may also be referred to as a monitoring system.

The system comprises at least two sensor modules, each configured to collect or record respective sensor data from a respective sensor such as a camera, a microphone, or another sensor associated with the sensor module, with the sensor providing the sensor data. Therein, the sensors may also be or comprise sensor units with several sensors. The sensor modules are configured to provide the sensor data to a data network of the system which connects different modules of the system, for instance to an analysis module and/or a storage module (as specified below). Correspondingly, said sensor modules can be considered as source modules, as they function as a source of the data in the network. The sensor modules are configured to provide the sensor data to the network with a time stamp, i.e. they are configured to add a time stamp to the sensor data. The sensor modules may be part of the same entity, such as the infrastructure to be monitored, or part of different entities. So, part of the sensor modules may be integrated in one entity, e.g. the infrastructure, and another part of the sensor modules may be integrated in one or more other entities, e.g. one or more vehicles. The sensor modules of different entities may be added and removed dynamically, i.e. during intended use, from the network and their respective sensor data may be accessed by the analysis module only when the sensor modules are part of the network.

Furthermore, the system comprises at least one analysis module configured to access the sensor data of one, several, or all sensor modules. Preferably, all sensor modules of the system can be accessed by the at least one analysis module. The analysis module may be configured to access the sensor data via the data network directly in (or from) the respective sensor modules or indirectly, that is, via a storage module where the sensor data of the sensor modules may be stored (which is described below). The analysis module may also comprise an access module that is configured to forward the accessed sensor data to another module, for instance a storage module and/or an output module. Such an access module can be considered as a distributing module that forwards the data from the designated analysis modules to one or more designated target modules, such as the storage module and/or output module mentioned above.

The analysis module is configured to detect, in particular automatically detect, a given or pre-set event based on (first) sensor data of at least one (first) sensor module and to associate (second) sensor data of at least one other (second) sensor module with the event based on the time stamps of the sensor data of the at least one (first) sensor module and the at least one other (second) sensor module. The analysis module may be or comprise a computer running analyzing routines or algorithms on the sensor data. In particular, the analysis module may comprise one or more neural networks, which are particularly strong in computing associations and/or learning correlations. The analysis module may be a general analysis module for detecting and/or analyzing event belonging to a large variety of classes of events, or a specific analysis module, which is configured to detect or analyze events of a specific class of events such as fires, vehicle malfunctions, or abnormalities in passenger behavior.

So, for example, in case of an earthquake, the analysis module might detect the earthquake as given event based on sensor data of one (first) sensor module with a vibration sensor, which can be referred to as first vibration sensor module. It might then, based on the time stamps of the sensor data, associate sensor data of another (second) sensor module with another vibration sensor as sensor, for instance. This associated sensor data can then, for instance, be used to confirm the detection of said event based on the first sensor data, here the earthquake. Alternatively, both the sensor data which the detection of the event is based on and the associated sensor data can be used to analyse the course and/or cause of the detected event. For instance, in case of a fire being detected as given event based on the first sensor data, sensor data of an electric current sensor, which has been recorded at the time of the fire or shortly before the fire, can be automatically associated with the event based on the time stamps of the sensor data. Consequently, the course and/or cause of the event can be analyzed with increase efficiency. In the example described, an abnormally increased current at the time of or slightly prior to the fire can be identified as cause of the fire by a human supervisor without manually searching through all available sensor data. Said increased current at the time of or slightly prior to the fire can, of course, then also be identified as cause of the fire by an algorithm such as a neural network with reduced computational effort. Therefore, the surveillance system is suited also for large and complex infrastructures, be it with or without associated vehicles.

Correspondingly, the analysis module may be configured to forward the sensor data the event detection is based on, i.e. the first sensor data, and the associated sensor data, i.e. the second sensor data, to an output module. The output module is configured to output the data to a supervisor and may comprise a monitor and/or a loudspeaker for that purpose. The analysis module may, in particular, be configured to only forward the sensor data the event detection is based on as well as the associated sensor data, and not forward other, arbitrary sensor data, to the output module for presentation to the supervisor. This saves network resources and makes the monitoring more clear and effective. Correspondingly, only the sensor data the event detection is based on as well as the associated sensor data may automatically be analyzed by an algorithm such as a neural network, and not the other, arbitrary sensor data in order to reduce computational effort.

The described system gives the advantage that even in very large and/or complex infrastructures with the huge manifold of different as well as similar sensors and sensor data available, surveillance and/or maintenance can be performed in an improved and flexible way.

Also, the event- and time-stamp-based approach described above can be used as a basis for a surveillance system capable of learning. In such a learning surveillance system, the associated sensor data and their corresponding sensor modules can be considered as candidates for future first sensor data, that is sensor data on which event detection may be based in the future. Thus, the sensor data of the corresponding candidate sensor modules may, in a subsequent time step, get used as one of the first sensor modules or even replace a first sensor module when event detection is done in the analysis module. Such a learning system can be realized by means of the known correlation-based learning, where correlation is regarded as causality given preset conditions or constraints are met. The above-mentioned neural networks are particularly useful in such a setting. So, the described surveillance system can be used for realization of a (self-)learning, i.e. supervised or unsupervised surveillance system, where suitable sensor data that correlate with an event are automatically picked, and event detection is optimized by relying on the picked sensor data, be it in addition or alternatively to the sensor data used for event detection before.

In one advantageous embodiment, only sensor data with a time stamp indicating a time which differs from an event time of the event by less than a given or preset maximum time interval is associated with the event. Therein, the event time is determined by the timestamp or the time stamps of the sensor data the detection of the event is based on. In particular, only sensor data with time stamps prior to the event time may be associated with the event. Alternatively, in particular to analyze the effects of an event that has been detected, only sensor data with time stamps after the event time may be associated with the event. This is useful, for instance, when studying the effect of an event such as an earthquake on a passenger flow in a station, for instance. The described conditions for the sensor data to be associated with the event may be referred to as temporal constraints. Advantageously, the analysis module may be configured to access the sensor data based on the timestamp. This is particularly useful, when the sensor data is the sensor data stored in a storage module (described below) in order to access only relevant sensor data.

This gives the advantage that, depending on the given maximum time interval, the sensor data to be associated or potentially associated with the event is drastically reduced, which lowers the computational effort required in the system and hence makes the system useful in larger surveillance systems. Furthermore, the associate sensor data stemming from roughly from the event time makes the sensor data more useful for the analysis of the event. This is true when the event is analyzed manually by a human supervisor, but also when the sensor data is analyzed automatically by the analysis module.

It has to be noted, that, in addition to the time stamps, further information may be used to select the sensor data of other second sensor modules to be associated with the event. So, the analysis module may be configured to associate sensor data of the at least one other second sensor module with the event based on the time stamps of the sensor data and one or more additional criteria or constraints. For example, prior to association with the event, the sensor data of the second sensor module in consideration may be analyzed in order to detect abnormalities or alike in the second sensor data, and be associated with the event only if an abnormality has been identified in, for instance, a given maximum time interval before the event time (further examples for the additional criteria are described below). The abnormality condition and the like may be referred to as content-wise constraint. In particular, such content-wise constraint can be learnt by the system. This may be achieved by unsupervised learning, where the statistic nature of some characteristics of the sensor data, e.g. a rarity of the respective characteristic, is used.

This gives the advantage that the relevant sensor data are selected and its analysis, be it automatically by the module or manually by a human supervisor, requires less resources. This makes the system specifically useful for large and complex infrastructures or vehicles.

In another advantageous embodiment, the analysis module is configured to associate the sensor data of the second sensor module with the event also based on a spatial relation between a location of the sensor associated with the first sensor module and a location of the sensor associated with the second sensor module. So, in this case, the additional criterion is the spatial relation and may be referred to as spatial constraint. Therein, the spatial relation may be given or preset by a user, for instance, or automatically determined, for instance via meta data contained in the sensor data, such as a GPS information tag. Apart from the distance, the spatial relation may include other characteristics, such as the sensors being separated by a wall, being in the same room, etc.

In particular, only sensor data of or from the sensor modules with the associated sensor within a given (maximum) spatial distance from the associated sensor of the first sensor module may be associated or correlated with the event. Alternatively, as described in more detail below, only sensor data of or from the sensor modules with the associated sensor outside of a given (minimum) spatial distance from the associated sensor of the first sensor module may be associated or correlated with the event. Also, only sensor data of or from the sensor modules with the associated sensor in a given range of distance from the associated sensor of the first sensor module may be associated or correlated with the event. It may depend on the event/class of event whether a minimum or maximum spatial distance of the sensor modules is chosen as additional criterion. So, for instance, in case of a local event such as a fire, it may be reasonable to select sensor modules with the associated sensor nearby, i.e. within a given distance from, the associated sensor of the first sensor module as second sensor modules. In case of a global event such as an earthquake, it may be a better approach to select a sensor module with the associated sensor away from the sensor associated with the first sensor module as second sensor module, i.e. select a sensor module with the associated sensor at a separately defined certain distance which corresponds to another, separate location outside a preset distance from the sensor associated with the first sensor module as second sensor module.

This gives the advantage that, again, the amount of sensor data associated with the event is reduced, and only meaningful, that is, relevant sensor data is associated with the event. This saves resources when analyzing the data associated with the event and thus makes understanding the event easier, both in on-line (or real-time) surveillance, as well as in off-line (or post event) event analysis.

The different constraints may be used in different combinations. In particular, different combinations of constraints may be selected for different events or event classes. The constraints or combinations of constraints appropriate for the event may also be learned by the system, be it by supervised learning methods or unsupervised learning methods.

In yet another advantages embodiment, the analysis module is configured to verify the detection of the event based on the sensor data associated with the event and/or the sensor data of the first sensor module. So, in particular also a combination of the sensor data of the second sensor module with the sensor data of the first sensor module may be used for event verification. For instance, if a vibration detector associated with the first sensor module detects a vibration pattern which is typical for an earthquake, another vibration detector associated with the second sensor module should to detect a similar pattern. If only one single vibration sensor module detects said typical vibration pattern, it could well be a false alarm due to some other influence on the first vibration detector module. In this verification process, it is highly advantageous that the sensor data are provided with the time stamps so that the verification can be particularly exact and precise. In this setting, it is also particularly useful if the timestamp is based on a common time signal provided to the different sensor modules (described below).

This gives the advantage of improved event detection and thus reliability of the surveillance system. It is particularly useful in large and complex infrastructures and/or vehicles with many sensors, as malfunctions and alike, i.e. false alarms scale with size and complexity.

In another advantageous embodiment, the analysis module is configured to classify and/or verify the detected event according to given event classes, and, based on the class the detected event is classified to belong to, associate sensor data of a predetermined sensor module and/or sensor data of a predetermined type of sensor modules with the event. In case of a learning system, in particular an unsupervised learning system, the analysis module may also be configured to associate the sensor data of the predetermined sensor module and/or the sensor data of the predetermined type of sensor modules with the class of event to improve event classification in the future. The event classes may be one or more of the following: global event, local event, dangerous event, maintenance event, rapid evolving event, slow evolving event, energy induced event, air environmental event. So, for instance in the above-mentioned example, in case an event such as an earthquake is classified as global event, data of other sensor modules with the associated sensors having a certain defined or preset distance to the first sensor module may be associated with the event. Also, in this case, sensor data of vibration-type sensor modules, that is, sensor modules with a vibration sensor, may be associated with the event for its verification.

This gives the advantage that the automatic processing in the analysis module is further improved and the computational load for the analysis of the event is reduced. Therefore, the system is particularly useful for surveilling and/or monitoring and/or maintaining complex systems.

In a further advantageous embodiment, the analysis module is configured to, based on the detected event and/or the class of the detected event, trigger an alarm output to an operator or the public by a corresponding output module. For instance, if a local event is not harmful, only a supervisor may be alerted by triggering the alarm. A global event with potential threat to the public, such as an earthquake, may be announced to the public by triggering the alarm. This further improves the surveillance performance of the system and the security of the monitored infrastructure and/or vehicle.

Consequently, in another advantageous embodiment, the analysis module may be configured to forward the sensor data to an output module, in particular an output module with a monitor and/or a loudspeaker. Here, the sensor data may provide comprise second and/or first sensor data.

In another advantageous embodiment, the analysis module is configured to, when an event is detected automatically access the sensor data associated with the event directly and/or by a storage module (preferably based on the timestamp) and forward the associate sensor data to an output module. In particular, the associated sensor data may be forwarded to the output module along with the first sensor data, and, for instance, displayed in parallel by the output module.

This gives the advantage of a “smart” surveillance system with automated and hence control, where attention of a supervisor can be drawn not only to abnormalities in a first sensor data, but also to associated second sensor data, i.e. to potential consequences and/or causes of the event, for instance. So, for instance, in case of an electric current abnormality detected as a respective event, an associated camera picture can immediately be output to a supervisor in order to check whether, for instance, a fire is just starting in the vicinity of the location of said abnormal electric current. So, security can be maintained and improved in the infrastructure.

In particular, the analysis module may be configured to forward the sensor data of or from the different sensor modules to the output module in a synchronized way. This means sensor data with the same (or, according to a pre-set criterion such as a maximum difference: similar) timestamp will be forwarded together and output, for instance displayed, at the same time. Alternatively, the analysis module may be configured to remotely configure another module, for instance one or more of the sensor modules or the storage module so as forward the sensor data directly to the output module.

This gives the advantage of a more realistic estimate of the state of infrastructure and of the vehicle being achieved by means of the sensor data. So, further processing by a computer or supervising by a human is easier.

In order to forward the sensor data of the at least two different source modules in a synchronized way, the analysis module may be configured to evaluate respective (relative and/or absolute) time lags of the sensor data stemming from the different sensor modules, and delay forwarding sensor data of at least one of the sensor modules based on the evaluated time lags, in particular based on the maximum time lag evaluated. So, the analysis module may be configured to forward sensor data from different sensor modules with a respective timestamp corresponding to the same point in time, which arrived at the analysis module at different times, that is, with different (relative) time lags, together and/or synchronized. In addition to or alternatively to said relative time lags, the module evaluating the time lag may evaluate an absolute time lag of the sensor data. This can, for instance, be realized by providing the respective module with the common time signal and comparing the time stamps of the sensor data with the common time signal reflecting global time. In particular, all sensor data that is forwarded by the analysis module may be forwarded together and/or synchronized. Alternatively, a subset of sensor data may be forwarded in an unsynchronized way, for instance the moment it arrives in the analysis module. When such unsynchronized sensor data is, for instance, output to a human operator, it is preferably marked as unsynchronized. This gives the advantage that the data which is prioritized to be observed with less delay than to be synchronized with other data can be shown with minimal delay as required and without confusing the human operator.

In yet another advantages embodiment, the sensor modules are of at least two qualitatively different types, where each type of sensor module is associated with a different type of sensor and is configured to collect a qualitatively different type of sensor data. This gives the advantage of a system that provides an extensive and particularly precise overview of the state of the monitored infrastructure and/or vehicle, and thus allows also extensive and precise surveillance and analysis of the data.

In particular, each of the different types of sensor modules may be associated with at least one of the following sensors as respective sensor: camera sensor, multi-camera sensor, microphone sensor, multi-microphone sensor, temperature sensor, fire alarm sensor, smoke sensor, voltage sensor, power consumption sensor, door sensor, emergency button sensor, escalator load sensor, vehicular sensor, electronic current sensor, flow rate sensor, pressure sensor, rotational speed sensor, translational speed sensor, rotational acceleration sensor, translational acceleration sensor, vibration sensor, motion detection sensor, radar sensor, Hall sensor, ultrasonic sensor, GPS (which may include any global positioning system, GPS, GLONASS, Galileo or alike) sensor, load cell sensor (which may for instance be used as a force gauge), light barrier sensor. So, one sensor module may collect sensor data from a camera sensor, which makes it a camera sensor module, while another sensor module may be associated with voltage sensor as respective sensor, which makes it a voltage sensor module, and so on. Said types of sensors and sensor modules have been proven particularly useful in surveillance and maintenance of infrastructures and/or vehicles, and thus are particularly advantageous.

In another advantageous embodiment the sensor modules and/or output modules and/or analysis modules have a unified interface (or unified interfaces) and/or are configured to be exchangeable or replaceable, in particular exchangeable or replaceable during the operation of the system ("hot-pluggable"). To this end, the sensor data can be encapsulated data, for instance in a so-called container format, where all sensor data has the same data format in spite of varying type of content. Then, the analysis module and/or the storage module can handle the data without needing information about the content. Also, in order to be exchangeable during the operation of the system, the different modules, for instance the sensor module of the vehicle and the sensor module of an infrastructure, may connect themselves via a wireless connection, for instance WLAN or Bluetooth.

This gives the advantage of a particularly flexible system, where sensor modules may be upgraded or exchanged during the operation and/or without the necessity of changing hardware and/or software in the rest of the system. This exchangeability also enables the flexible integration of sensor modules of different entities such as an infrastructure and varying vehicles into the surveillance and/or maintenance system. In such a setting, the sensor module of the vehicle can be accessed (as a source module) by the analysis module of the infrastructure (as a target module), hence allowing the system to integrate vehicles when they enter the infrastructure and hence their state is relevant to the state of the infrastructure.

In another advantageous embodiment, the system comprises at least one storage module which is configured to store the sensor data of at least one sensor module. In particular, the at least one storage module is configured to store the sensor data of at least two sensor modules or all sensor modules. The at least one analysis module is configured to access the collected sensor data in the sensor module and/or the stored sensor data in the storage module. Obviously, the analysis module may access the sensor data in the sensor module and forward it to the storage module (and/or another module such as an output module), while a second analysis module may access the sensor data in the storage module, for instance.

This gives the advantage that the flexibility of the system is further increased, as, for instance in order to reduce data traffic in the network, only part of the sensor data may be forwarded to a first analysis module, for instance as soon as the data is available, but the complete sensor data may be stored for later analysis. Also, by storing the sensor data, an off-line functionality may be enabled where the complete sensor data (which may also comprise data not relevant in the daily routine) can be reviewed after some event occurred, in order to pinpoint cause and/or effect of said event.

Therein, each sensor data stored in the storage module may comprise a plurality of sub-data, where each sub-data has a specific timestamp, and the analysis module is configured to, when accessing store sensor data in the storage module, access only sub-data with the timestamp that is specified for the particular accessing or a time stamp within a specified, i.e. preset range that is specified for the particular accessing. This gives the advantage of an accessing functionality inside the storage module, which reduces traffic load in the network, as only the required data specified in the accessing has to be transmitted, which is minimized in size. Specifying a time range for the time stamp instead of a particular time stamp gives the advantage to search the data within given range (time A to Time B), not every time necessarily with exact match.

In a further advantageous embodiment, the sensor modules and/or the at least one analysis module and/or other at least one storage module can be configured remotely and/or dynamically during operation of the system as functioning surveillance system. For instance, an analysis module of a vehicle such as a train, can be, at the time of entering an infrastructure such as a train station, configured to forward sensor data of specific sensor modules of the vehicle to a corresponding analysis module and/or output module of the infrastructure when entering the infrastructure. At the time of leaving the infrastructure, the analysis module of the vehicle may be configured to forward sensor data of a different specific sensor module to the respective module located in the infrastructure.

This gives the advantage of further flexibility and reduction of the complexity of the system, as the respective modules can be configured to the specific requirements in the situation at hand dynamically, which reduces the administration overhead and unnecessary transmission of data and thereby increases clarity of data output to human supervisor.

In yet another advantageous embodiment, the sensor modules and/or the at least one analysis module and/or the at least one storage module can be configured to collect, respectively access, and/or store sensor data only in one or more preset time intervals and/or only with a data rate limited by a predetermined or preset maximum data rate. This preset time interval or preset maximum data rate may also be preset dynamically, for instance in dependence upon a network load. In particular, the preset time intervals may be determined by a maximum size of the sensor data corresponding to the pre-set time intervals, that is determined by the size of the sensor data forwarded for a certain period of time taken into account. For instance, a camera may be configured to transmit only every second collected or recorded image to a corresponding access module.

This gives the advantage that a data load in the network of the system may be reduced, avoiding data congestions and the corresponding undesired effects, while the effective monitoring of infrastructure and vehicle is still possible according to preset criteria. For instance, transmitting only every second image of a camera still allows an effective visual monitoring of an area whereas transmitting the complete set of all images in half of the time may result in a less effective monitoring.

In another advantageous embodiment, the system comprises a clock module which is configured to provide a common time signal to at least one, preferably some or all sensor modules and/or the analysis module, where the time stamp of the sensor modules is based on the common time signal. The clock may also provide the common time signal to the at least one storage module, if present. The common time signal may contain time-zone information in order to avoid data synchronization confusion. This gives the advantage of further increased accuracy in processing the sensor data and analyzing the event.

The clock module may be realized in one single, integrated hardware unit, but may also be realized by several distinct and/or distributed collaborating clock units. The collaborating clock units may also be cascaded. Preferably, the collaborating clock units are synchronized. For instance, one clock module (or one clock unit of the clock module) may work as a source for an absolute-time signal by network time protocol (NTP) and another clock module (or another clock unit of the clock module) may work as a source for a sequentially numbered heart-beat-time signal by different protocol, where latter clock module (or unit) is synchronized to former clock module (or unit) through NTP.

This gives the advantage of synchronizing the all sensor modules including the ones which are not compliant with NTP protocol or such high-level communication capability by the reason of limited computational resources.

Another aspect relates to a method for surveilling or monitoring an infrastructure and/or a vehicle, with several method steps. One method step is collecting, by at least two sensor modules, respective sensor data from a respective sensor associated with the respective sensor module. Another method step is accessing, by at least one analysis module, the sensor data. The method further comprises the method step of providing, by the sensor modules, the sensor data with a time stamp. Another method step is detecting, by the analysis module, a given event based on sensor data of at least one (first) sensor module and to associate sensor data of at least one other (second) sensor module with the event based on the time stamps of the sensor data.

Advantages and advantageous embodiments of the method correspond to advantages and advantageous embodiments of the surveillance and/or maintenance system.

The features and combinations of features described above, as well as the features and combinations of features disclosed in the FIGURE description or the figures alone may not only be used alone or in the described combination, but also with other features or without some of the disclosed features without leaving the scope of the invention. Consequently, embodiments that are not explicitly shown and described by the figures but that can be generated by separately combining the individual features disclosed in the figures are also part of the invention. Therefore, embodiments and combinations of features that do not comprise all features of an originally formulated independent claim are to be regarded as disclosed. Furthermore, embodiments and combinations of features that differ from or extend beyond the combinations of features described by the dependencies of the claims are to be regarded as disclosed.

Exemplary embodiments are further described in the following by means of a schematic drawing. Therein, FIG. 1 shows an exemplary embodiment of a surveillance system for an infrastructure and/or a vehicle.

The surveillance system 1 of FIG. 1 comprises at least two, in the present example four sensor modules 2*a*-2*d* which are configured to collect respective sensor data I, F1, F2, V from respective associated sensors 3*a*-3*d*. So, for instance, the first sensor 2*a* collects or records respective sensor data I from the first sensor 3*a*, the second sensor module 2*b* collects sensor data F1 from the second sensor 3*b* et cetera. In the present example, the system 1 has a current sensor module 2*a*, a first vibration frequency sensor module 2*b*, a second vibration frequency module 2*c*, and a video sensor module 2*d*. Furthermore, in the example at hand, a clock module 4 provides a common time signal t to the sensor modules 2*a*-2*d*. The sensor modules 2*a*-2*d* are configured to provide the sensor data I, F1, F2, V with a corresponding timestamp. The timestamp is based on the common time signal and enhances accuracy and reliability of the surveillance system.

The surveillance system 1 furthermore comprises an analysis module 5, which is configured to access the sensor data and to detect a given event based on sensor data of at least one sensor module and to associate, based on the time stamps of the respective sensor data, sensor data of at least one other sensor module with the event. The one sensor module and the other sensor module may generally be referred to as first and second sensor module and may be any sensor module of the system 1, not to be mixed with the first, second, third, . . . sensor modules 2a-2d of the present embodiment. So, as described below, for instance the second sensor module 2b may be the first sensor module in the above meaning.

In the present example, the analysis module 5 comprises an access module 6 which is configured to access the time-stamped sensor data $I_t$, F$\mathbf{1}_t$, F$\mathbf{2}_t$, $V_t$ from the respective sensors 2a-2d. The event detection and association of sensor data with each other is, in the present example, realized in a computation module 7. The computation module 7 is part of the analysis module 5. Access module 6 and computation module 7 may be realized as a separate software and/or hardware units, where, for instance, the access module 6 is located in a different location from the computation module 7.

Instead of the configuration shown in the drawing at hand, the analysis module 5 may also be configured to access the sensor data from a storage module instead of from the respective sensor modules to a 2 to the (not shown).

In the present example, the surveillance system 1 is configured to detect events in live sensor data, which may be referred to a "online" surveillance, where an infrastructure and/or vehicle is monitored during its intended use/operation. By contrast, the before mentioned accessing of sensor data stored in the storage module may be referred to as "off-line" surveillance or analysis, which is aimed at analyzing stored data well after, for example, hours, days or even weeks after a specific event (such as an accident) has happened with the purpose to analyze and understand the event better and potentially avoid such an event in the future.

The analysis module 5 of FIG. 1 is configured to trigger an alarm output based on the detected event. The alarm output is output to an operator and/or the public by a corresponding output module 8. In order to enhance reliability of event detection, in the present example, the analysis module 7 is configured to verify the detection of the event based on the sensor data associated with the event and the sensor data of the first sensor module, as described in the following.

In the example of FIG. 1 this is illustrated by several sensor data packages I(1), I(2), I(3), F1(1), F1(2), F1(4), F2(1), F2(4), V(1), V(2), V(4) placed on a time axis t. For illustration purposes only, the time axis t now exemplarily refers only to a limited number of points of time 1-4. At t=1, in the present example, data packages, I(1) F1(1), F2(1), and V(1) are available. At time step t=2, three data packages I(2), F1(2), V(2) are available. In the present example, at the third time step, t=3, only one sensor data package I(3) is available. At the fourth time step, t=4, three sensor data packages F1(4), F2(4), V(4) are available.

Here, the analysis module 5 detects a given event based on sensor data of one sensor of the sensor modules 2a-2d, for instance a frequency signature typical for an earthquake in the sensor data package F2(4) of the second frequency sensor module 2c. The event of an earthquake may be classified as belonging to a class of global events, which is thus, in the example at hand according to a pre-set rule stored in the analysis module 5, to be verified by sensor data of another, second sensor module of the same type as the initial sensor module. In the present case, this other, second sensor module is the first frequency sensor module 2b, which provides frequency sensor data package F1(4) from t=4, the event time.

Also, according to the exemplary configuration at hand, the sensor data to be associated with the event has to belong to the same time as the event time. Thus, the analysis module 5 could, in principle, also associate the sensor data of the video sensor module 2d with an event taking place at t=4, as, according to the timestamp, sensor data package V(4) reflects the state of the infrastructure and/or vehicle at the same time, than the time of the event. However, as in the present case the detected event is an earthquake and, accordingly, the sensor data to be associated with the event is predetermined as stemming from a specific sensor, here the frequency sensor 3b, the sensor data package V(4) is not associated with the event.

In case of an alternative event, for instance a fire at time step t=2, which is detected based on video sensor data package V(2), correspondingly, as the event of fire might belong to another event class, not the frequency sensor data package F1(2), but the current sensor package I(2) might be associated with the event.

Regardless of the concrete type of event or class of event at hand, the event is detected based on first sensor data, frequency sensor data F$\mathbf{2}_t$ in the case of the earthquake and video sensor data $V_t$ in case of the fire, of a corresponding first sensor module, the second frequency sensor module 2c or the camera sensor module 2d, respectively. Respective sensor data F$\mathbf{1}_t$, $I_t$ of another sensor module 2b, 2a is associated with the event based on the time stamps of the sensor data $I_t$, F$\mathbf{1}_t$, F$\mathbf{2}_t$, $V_t$. The analysis module 5 of the present system 1, is, in both cases, configured to verify the detection of the respective event based on the sensor data F$\mathbf{1}_t$, $I_t$ associated with the event and, in particular, also of the sensordata F$\mathbf{2}_t$, $V_t$ of the corresponding first sensor module, be it the first frequency sensor module 2c or the video sensor module 2d.

In FIG. 1 this is illustrated for the example of the earthquake, where the event is happening at t=4. The analysis module 5 is detecting D the event in the sensor data package F2(4) of the frequency sensor module 2c and verifying or confirming C the event based on the frequency sensor data F1, namely the frequency sensor data package F1(4), of the frequency sensor module 2b. So, in the present example, if verifying C gives a negative result, which is symbolized by N in the FIGURE, the alarm output is not triggered and the process is terminated, processing/method step O. If, on the other hand, verifying C gives a positive result, which is symbolized by Y in the FIGURE, the event is confirmed by the associated sensor data F1 and in a corresponding processing step Z, the alarm output is triggered.

For instance, in case the frequency sensor data package F1(4) does not comprise the frequency signature typical for an earthquake (which it should in the case of a real earthquake) the confirmation step C is negative, and no output will be triggered (arrow N, processing step O). In the case the frequency sensor package F1(4) shows the characteristic frequency signature indicating an earthquake just as the frequency package F2(4), the confirmation step C is positive and outputting the alarm by output module 8 is triggered (arrow Y, processing step Z).

Obviously, the surveillance system according to the depicted example is not limited to the configuration explained above, but serves only as illustrational example for the advantages such as enhanced reliability and enhanced automatic processing of sensor data stemming from many sensor modules in a large and/or complex infrastructure, with or without a vehicle.

The invention claimed is:

1. Surveillance system for an infrastructure and/or for a vehicle, comprising at least first and second sensor modules configured to collect respective sensor data from a respective associated sensor; and an analysis module configured to access the sensor data; Wherein the sensor modules are configured to provide the sensor data with a time stamp; and the analysis module is configured to detect a given event based on sensor data of at least one first sensor module and to associate sensor data of at least one second sensor module with the event based on the time stamps of the sensor data, wherein the analysis module is configured to associate the sensor data of the second sensor module with the event based on a spatial relation between a location of the sensor associated with the first sensor module and a location of the sensor associated with the second sensor module, wherein the analysis module is configured, in accordance with a class of the detected event, such that only sensor data of second sensor modules with the associated sensor within/or outside of a given distance from the associated sensor of the first sensor module is associated with the event, wherein the event class includes at least a global event and a local event, wherein the sensor data of the first sensor module and the sensor data of the second sensor module that are associated with the global event are selected so that the sensor associated with the first sensor module and the sensor associated with the second sensor module are outside a given spatial distance, and wherein the sensor data of the first sensor module and the sensor data of the second sensor module that are associated with the local event are selected so that the sensor associated with the first sensor module and the sensor associated with the second sensor module are within a given spatial distance.

2. System according to claim 1, wherein only sensor data with a time stamp indicating a time which differs from an event time by less than a given maximum time interval is associated with the event, where the event time is determined by the time stamp of the sensor data the detection of the event is based on.

3. System according claim 1, wherein the analysis module is configured to verify the detection of the event based on the sensor data associated with the event and/or the sensor data of the first sensor module.

4. System according to claim 1, wherein the analysis module is configured to classify and/or verify the detected event according to given event classes, and, based on the class the detected event is classified to belong to, associate sensor data of a pre-determined sensor module and/or sensor data of a pre-determined type of sensor modules with the event.

5. System according to claim 1, wherein the analysis module is configured to, based on the detected event and/or the class of the detected event, trigger an alarm output to an operator or to the public by a corresponding output module.

6. System according to claim 1, wherein the analysis module is configured to, when the event is detected, automatically access the sensor data associated with the event and forward the associated sensor data to an output module.

7. System according to claim 1, wherein the analysis module is configured to forward the sensor data to an output module with a monitor and/or a loudspeaker.

8. System according to claim 7, wherein the analysis module is configured to forward the sensor data of the different sensor modules to the output module in a synchronized way.

9. System according to claim 1, wherein the sensor modules are of at least two different types, where each type of the sensor modules is associated with a different type of sensor and is configured to collect a different type of sensor data.

10. System according to claim 9, wherein each of the different types of sensor modules is associated with at least one of following sensors as respective sensors: camera sensor, multi camera sensor, microphone sensor, multi microphone sensor, temperature sensor, fire alarm sensor, smoke sensor, voltage sensor, power consumption sensor, door sensor, emergency bottom sensor, escalator load sensor, vehicle load sensor, electronic current sensor, flow rate sensor, pressure sensor, rotational and/or translational speed sensor, rotational and/or translational acceleration sensor, vibration sensor, motion detection sensor, radar sensor, Hall sensor, ultrasonic sensor, GPS sensor, load cell sensor, light barrier sensor.

11. System according to claim 1, wherein at least one storage module is configured to access and store the sensor data of the sensor modules, where the at least one analysis module is configured to access the sensor data in the sensor module and/or the sensor data in the storage module.

12. System according to claim 1, wherein a clock module is configured to provide a common time signal to some or all sensor modules and/or the analysis module, where the time stamp of the sensor modules is based on the common time signal.

13. Method for surveilling an infrastructure and/or a vehicle, with the method comprising the steps of:

collecting, by at least first and second sensor modules, respective sensor data from respective sensors associated with the respective sensor modules;

accessing, by at least one analysis module, the sensor data;

providing, by the sensor modules, the sensor data with a time stamp;

detecting, by the analysis module, a given event based on sensor data of the at least one first sensor module and to associate sensor data of the at least one second sensor module with the event based on the time stamps of the sensor data, associating, by the analysis module, the sensor data of the second sensor module with the event based on a spatial relation between a location of the sensor associated with the first sensor module and a location of the sensor associated with the second sensor module, wherein, in the associating, the analysis module is configured, in accordance with a class of the detected event, that only sensor data of second sensor modules with the associated sensor within/or outside of a given distance from the associated sensor of the first sensor module is associated with the event, wherein the event class includes at least a global event and a local event, wherein the sensor data of the first sensor module and the sensor data of the second sensor module that are associated with the global event are selected so that the sensor associated with the first sensor module and the sensor associated with the second sensor module are outside a given spatial distance, and wherein the sensor data of the first sensor module and the sensor data of the second sensor module that are associated with the local event are selected so that the sensor associated with the first sensor module and the sensor associated with the second sensor module are within a given spatial distance.

* * * * *